(12) United States Patent
Wu et al.

(10) Patent No.: US 10,911,593 B2
(45) Date of Patent: Feb. 2, 2021

(54) ELECTRONIC DEVICE HAVING A ROTATABLE CAMERA MODULE

(71) Applicant: ASUSTeK COMPUTER INC., Taipei (TW)

(72) Inventors: I-Hsi Wu, Taipei (TW); Jen-Pang Hsu, Taipei (TW); Ling-Yen Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/868,569

(22) Filed: May 7, 2020

(65) Prior Publication Data
US 2020/0366784 A1 Nov. 19, 2020

Related U.S. Application Data

(60) Provisional application No. 62/848,074, filed on May 15, 2019.

(30) Foreign Application Priority Data

Nov. 28, 2019 (TW) .............................. 108143483 A

(51) Int. Cl.
*H04M 1/00* (2006.01)
*H04M 1/725* (2021.01)
*H04M 1/02* (2006.01)

(52) U.S. Cl.
CPC ..... *H04M 1/72597* (2013.01); *H04M 1/0264* (2013.01); *H04M 2250/12* (2013.01)

(58) Field of Classification Search
CPC .......... H04M 1/72597; H04M 1/0264; H04M 2250/12

(Continued)

(56) References Cited

U.S. PATENT DOCUMENTS

| 7,627,342 B2* | 12/2009 | Kang | H04M 1/0218 348/14.01 |
| 7,672,118 B2* | 3/2010 | Yamazato | H04N 5/2252 361/679.02 |
| 7,782,375 B2* | 8/2010 | Chambers | H04N 7/142 348/239 |
| 8,010,154 B2* | 8/2011 | Chambers | H04M 1/0264 455/556.1 |

(Continued)

FOREIGN PATENT DOCUMENTS

| CN | 102572031 B | 12/2014 |
| CN | 104255015 A | 12/2014 |

(Continued)

*Primary Examiner* — Sonny Trinh
(74) *Attorney, Agent, or Firm* — McClure, Qualey & Rodack, LLP

(57) ABSTRACT

An electronic device is provided, which includes a body, a display screen, a camera module, orientation sensing elements, and a processor. The display screen is disposed on a first side of the body. The camera module is rotatably disposed on the body and captures image data. The orientation sensing elements are respectively disposed on the body or the camera module. The orientation sensing elements detect respective positions of the camera module or the body to generate a plurality of position information. The processor selectively performs image processing on the image data captured by the camera module based on whether the camera module is turned over by an external force or whether the electronic device receives an incoming call signal. The electronic device determines whether the camera lens of the mobile phone is flipped by the external force when using the mobile phone for work, live stream or video communication.

10 Claims, 5 Drawing Sheets

(58) Field of Classification Search
USPC .......................................................... 455/566
See application file for complete search history.

(56) References Cited

U.S. PATENT DOCUMENTS

| | | | |
|---|---|---|---|
| 10,291,847 B2 | 5/2019 | Chin et al. | |
| 2007/0273752 A1* | 11/2007 | Chambers | H04N 5/2354 348/14.02 |
| 2011/0281618 A1* | 11/2011 | Chambers | H04N 5/2354 455/556.1 |

FOREIGN PATENT DOCUMENTS

| | | |
|---|---|---|
| CN | 204425471 U | 6/2015 |
| CN | 105955779 A | 9/2016 |
| CN | 107509038 A | 12/2017 |
| CN | 104954676 B | 3/2018 |
| CN | 107819907 A | 3/2018 |
| CN | 107872582 A | 4/2018 |
| CN | 104301609 B | 9/2018 |
| CN | 108495039 A | 9/2018 |
| CN | 108509782 A | 9/2018 |
| CN | 108683795 A | 10/2018 |
| CN | 108989660 A | 12/2018 |
| CN | 109167894 A | 1/2019 |
| CN | 109388925 A | 2/2019 |
| CN | 103873652 B | 3/2019 |
| CN | 109639965 A | 4/2019 |
| TW | M417729 U | 12/2011 |
| TW | M436853 U | 9/2012 |
| TW | 201631954 A | 9/2016 |
| TW | 201702808 A | 1/2017 |

* cited by examiner

ELECTRONIC DEVICE HAVING A ROTATABLE CAMERA MODULE

CROSS-REFERENCE TO RELATED APPLICATION

This application claims the priority benefit of Taiwan application serial No. 108143483 filed on Nov. 28, 2019, and U.S. provisional application Ser. No. 62/848,074, filed on May 15, 2019. The entirety of the above-mentioned patent application is hereby incorporated by reference herein and made a part of specification.

BACKGROUND OF THE INVENTION

Field of the Invention

The invention relates to an electronic device.

Description of the Related Art

Users might operate a mobile phone with a flipped camera for live streaming or video communicating, when the camera of the mobile phone is flipped accidentally, it may cause inconvenience or privacy leaking and results poor user experience.

BRIEF SUMMARY OF THE INVENTION

An electronic device is provided according to an aspect. The electronic device includes: a body; a display screen, disposed on a first side of the body; a camera module, rotatably disposed on the body and configured to capture image data; a plurality of orientation sensing elements disposed on the body or the camera module, respectively, the orientation sensing elements are configured to detect positions of the camera module or the body respectively to generate a plurality of position information; and a processor, electrically connected to the display screen, the camera module, and the orientation sensing elements, and the processor is configured to perform the following steps: determining an incoming call signal is received or the camera module is inverted by an external force when the electronic device is in a front camera mode; and executing an image processing program on the image data received from the camera module to generate a processed image data and controlling the display screen to display the processed image data when the processor determines that the incoming call signal is received or the camera module is rotated by the external force.

In summary, the electronic device and the control method provided herein avoid causing inconvenience or leaking privacy pictures when a user using a phone for working, live streaming, or video communicating, and avoids the camera to flip accidentally or an application in video communication is affected due to sudden receiving an incoming call signal. Detect the position changes of the electronic device through multiple orientation sensing elements, and processes by the hardware abstraction layer module in the processor to control the output streaming image and related accessories to improve the user experience of the electronic device.

These and other features, aspects and advantages of the present invention will become better understood with regard to the following description, appended claims, and accompanying drawings.

DETAILED DESCRIPTION OF THE EMBODIMENTS

In this article, using the terms first, second, third, etc. to describe various components, elements, regions, layers, and/or blocks is understandable. However, these components, elements, regions, layers and/or blocks should not be limited by these terms. These terms are limited to identifying single elements, components, regions, layers, and/or blocks. Therefore, a first element, component, region, layer, and/or block in the following may also be referred to as a second element, component, region, layer, and/or block without departing from the intention of the present invention.

Unless otherwise defined, all terms (including technical and scientific terms) used herein have their ordinary meanings, and their meanings can be understood by those who skilled in the art. Unless there is a specific definition, the definitions of the above words in commonly used dictionaries should be interpreted in the content of this specification as meanings consistent with the fields related to the present invention.

Figure 1A:
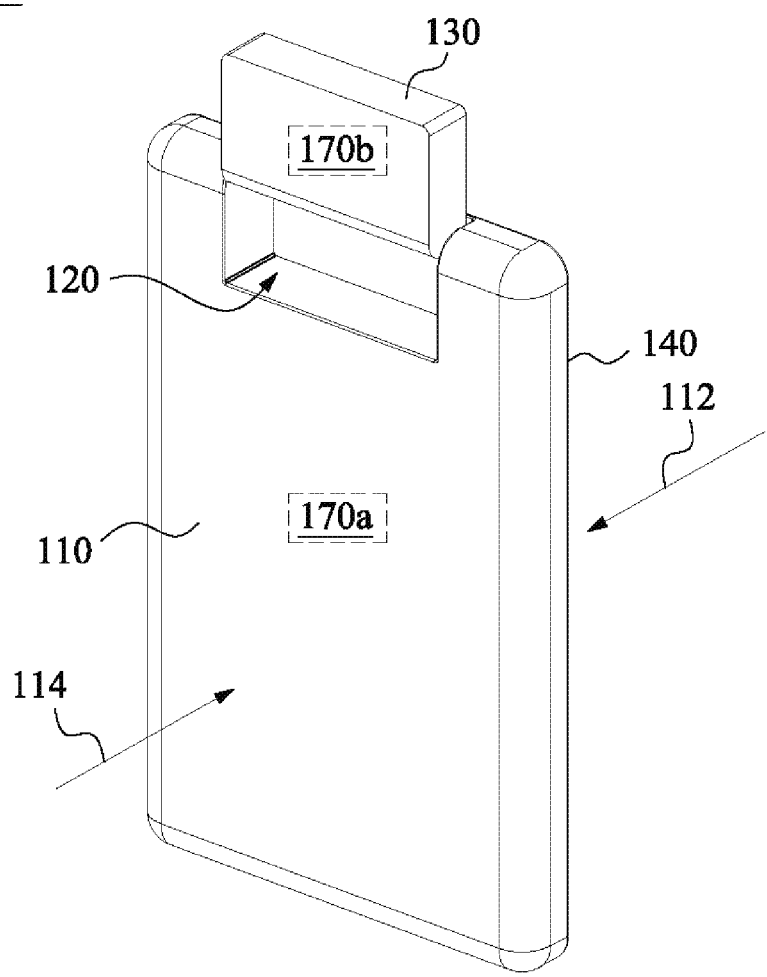
FIG. 1A is a schematic diagram of the appearance of an electronic device according to some embodiments.

Refer to FIG. 1A. FIG. 1A is a schematic diagram of an appearance of an electronic device 100 according to some embodiments. In different applications, the electronic device 100 is a mobile phone, a tablet, a personal computer, a laptop and other devices. For example, the electronic device 100 is a smart phone to execute applications such as making phone calls and live stream.

As shown in FIG. 1A, the electronic device 100 includes a body 110, a camera module 130, and a display screen 140. The body 110 includes a first side 112 and a second side 114 opposite to each other. The display screen 140 is disposed on the first side of the body 110, and configured to display image data D1 or processed image data D2. The camera module 130 is rotatably disposed on the body 110, and the camera module 130 rotates between a first position (such as a rear lens position) and a second position (such as a front lens position). In one embodiment, an accommodation space 120 is provided on the second side 114 of the body 110 to accommodate the camera module 130, and the camera module 130 is configured to capture the image data. In an embodiment, when the camera module 130 is at the first position (the rear lens position), the camera module 130 is located at the second side 114 of the body 110. Under the condition, the camera module 130 captures images from the back of the body 110. When the camera module 130 is at the second position (the front lens position), the camera module 130 and the display screen 140 face the same direction.

Under the condition, the camera module 130 captures images from the front of the body 110.

Figure 1B:
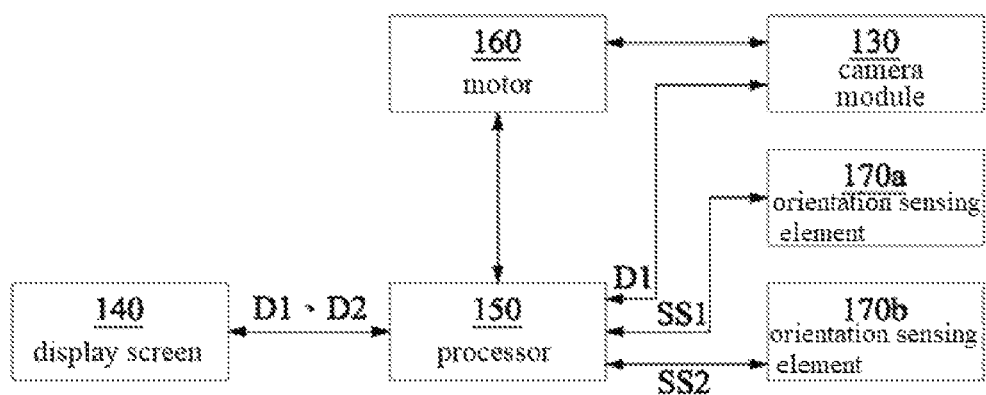
FIG. 1B is a block diagram of an electronic device according to some embodiments.

Please refer to FIG. 1A and FIG. 1B. The electronic device 100 includes the body 110, the camera module 130, the display screen 140, a processor 150, a motor 160, and orientation sensing elements 170a and 170b. The processor 150 is electrically connected to the camera module 130, the display screen 140, the motor 160, and the orientation sensing elements 170a and 170b. The motor 160 is electrically connected to the camera module 130 to drive the camera module 130 to rotate relative to the body 110. In an embodiment, the electronic device 100 includes two orientation sensing elements 170a and 170b that disposed on the body 110 and the camera module 130, respectively. The orientation sensing element 170a disposed on the body 110 senses the position of the body 110 to generate position information SS1. The orientation sensing element 170b disposed in the camera module 130 senses the position of the camera module 130 to generate another position information SS2. In one embodiment, the processor 150 is a central processing unit (CPU), an application-specific integrated circuit (ASIC), multiple processors, a distributed processing system, or a suitable processing circuit. In one embodiment, the display screen 140 is a touch screen.

In an embodiment, each of the orientation sensing elements 170a and 170b includes at least one of a gyroscope and a gravity sensor. The gyroscopes are configured to detect the current angular velocities of the body 110 and the camera module 130 as the position information SS1 and SS2, respectively, and the gravity sensors are configured to detect the current gravity values of the body 110 and the camera module 130 as the position information SS1 or SS2. In this way, the processor 150 determines the angle between the camera module 130 and the body 110 according to the angular velocities detected by the gyroscopes. The processor 150 also determines the angle between the camera module 130 and the body 110 or whether the electronic device 100 is horizontal or vertical according to the gravity value detected by the gravity sensor. In some embodiments, the electronic device 100 further includes a circuit element such as a graphics card (not shown) or an audio and video processing circuit (not shown). The above circuit elements provides the processed image data for display on the display screen 140 based on the control of the processor 150.

Figure 2A:
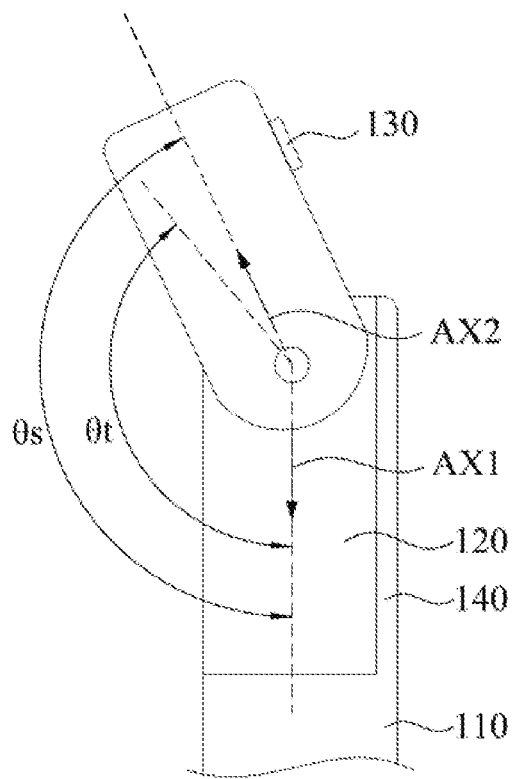
FIG. 2A is a schematic diagram showing a camera module of an electronic device flipped in a flip angle relative to a body in an embodiment.
Figure 2B:
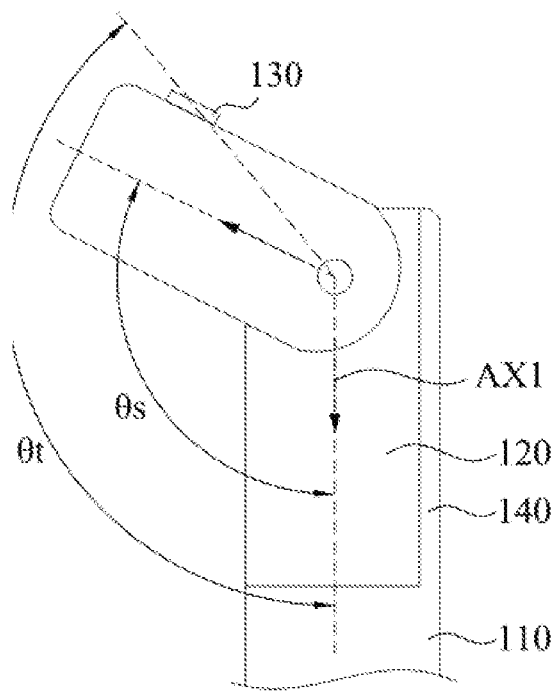
FIG. 2B is a schematic diagram showing the camera module of the electronic device flipped relative to the body to another flip angle in an embodiment.

Please refer to FIG. 2A to FIG. 2D. FIG. 2A to FIG. 2D are schematic diagrams of the camera module 130 of the electronic device 100 rotated to the body at different the flip angles in some embodiments. Since the camera module 130 rotates relative to the body 110, different angles θs is formed between the extension axis AX1 of the camera module 130 and relative the extension axis AX2 of the body 110 when the camera module 130 is rotated to different positions, as shown in FIG. 2A and FIG. 2B.

Figure 2C:
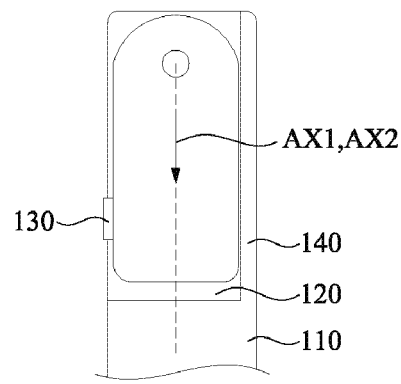
FIG. 2C is a schematic diagram showing the camera module of the electronic device flipped relative to the body to further another flip angle in an embodiment.
Figure 2D:
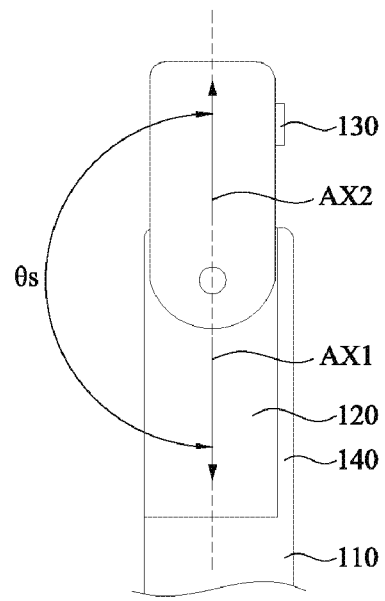
FIG. 2D is a schematic diagram showing the camera module of the electronic device flipped relative to the body to further another flip angle in an embodiment.

In an embodiment, as shown in FIG. 2D, when the electronic device 100 is in the front lens mode (for example, the electronic device 100 is performing a video communication function or a live stream function), the camera module 130 flips to the top position (the second position) as shown in FIG. 2D. At this time, the extension axis AX2 where the camera module 130 is located is in an opposite direction relative to the extension axis AX1 of the display screen 140, and the angle θs between the extension axis AX1 and the extension axis AX2 is 180 degrees. At this time, the lens direction of the camera module 130 completely faces the front direction of the body (that is, the same direction as the display screen 140 faced).

In an embodiment, as shown in FIG. 2C, when the electronic device 100 is in the rear lens mode (for example, when the user operates the electronic device 100 to capture the surrounding scenery or record the surrounding scenes), the camera module 130 flips to the bottom, back to the accommodation space 120, as shown in FIG. 2C (the first position). The angle between the extension axis AX2 of the camera module 130 and the extension axis AX1 of the body 110 is 0 degrees. At this time, the lens direction of the camera module 130 completely faces the rear direction of the body (that is, the lens direction opposite to the display screen 140 faced).

Figure 3:
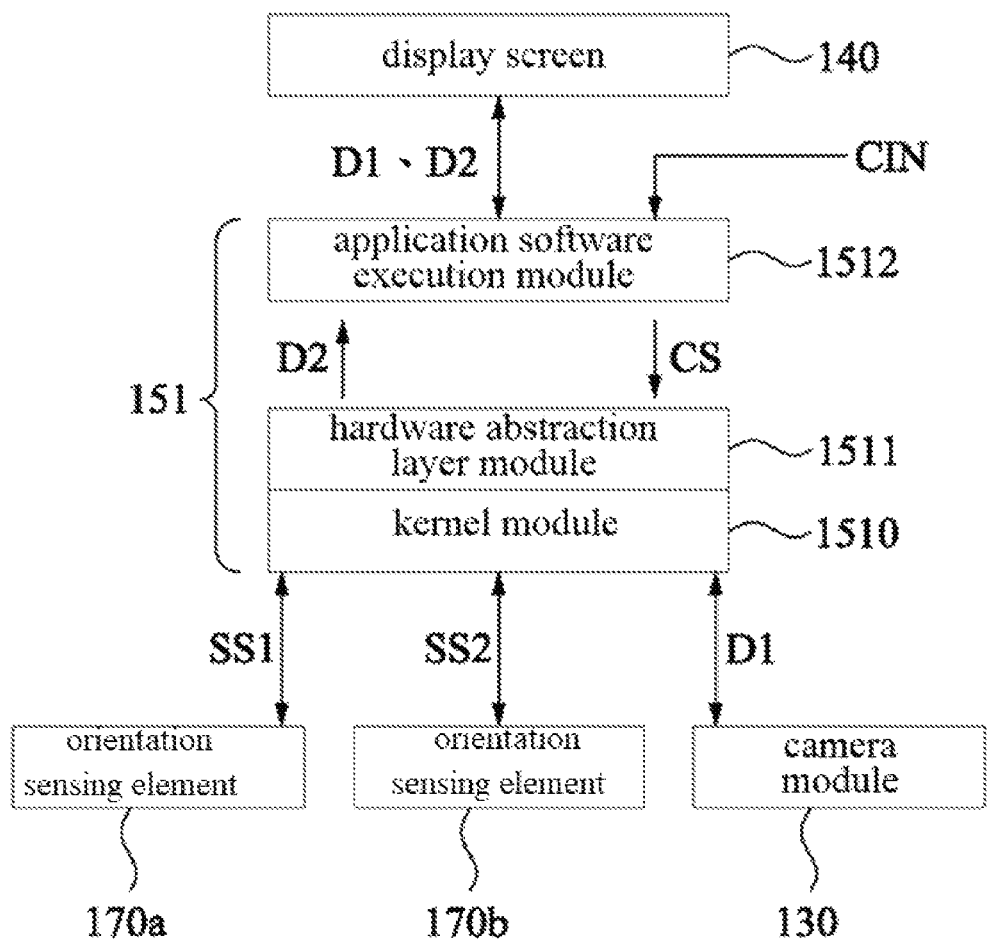
FIG. 3 is a schematic diagram of an internal architecture of an operating system executed by the processor according to some embodiments.

Please refer to FIG. 1 to FIG. 3. In an embodiment, when the processor 150 determines that the electronic device 100 is in the front lens mode, the processor 150 calculates the angle θs between the camera module 130 (which has the extension axis AX2) and the body 110 (which has the extension axis AX1) according to the position information SS1 and SS2 (such as the angular velocity) received from the orientation sensing element 170a disposed in the body 110 and the orientation sensing element 170b disposed in the camera module 130, that is, the angle θs is also between the extension axis AX2 and the extension axis AX1. Then, the processor 150 compares the angle θs with a preset angle θt (such as 150 degrees). When the electronic device 100 is in the front camera mode, the standard value of the angle θs between the camera module 130 and the body 110 is 180 degrees in the preset state without applying an external force (as shown in FIG. 2D). When the processor 150 detects that the angle θs is less than the preset angle θt (such as less than 150 degrees), the processor 150 determines that the camera module 130 is rotated by an external force. At this time, the processor 150 performs an image processing program on the image data D1 generated by the camera module 130 to generate the processed image data D2, and controls the display screen 140 to display the processed image data D2.

For details, see FIG. 2B. In this embodiment, the electronic device 100 is in the front camera mode, and the camera module 130 is flipped back to a position where the angle θs between the body module 110 and the body 110 is approximately 135 degrees due to the external force. At this time, the position of the camera module 130 has largely deviated from the standard position of the front lens mode originally set (that is, the second position where the angle is 180 degrees). When the electronic device 100 is originally in the front lens mode, the electronic device 100 detects that the change of the angle between the camera module 130 and the body 110 reaches 45 degrees due to the camera module 130 is flipped by the external force (the angle θs changes from 180 degrees to 135 degrees), and the image data D1 captured by the camera module 130 does not matches an expected image data (for example: the image data does not include users). At this time, the processor 150 performs the image processing program on the image data D1 to generate the processed image data D2.

On the other hand, when the angle θs is greater than (or equal to) the preset angle θt (for example, 150 degrees), the processor 150 does not perform an additional image processing program on the image data D1 generated by the camera module 130, the processor 150 controls the display screen 140 to directly display the image data D1.

In the embodiment in FIG. 2A, the angle θs between the camera module 130 and the body 110 is approximately 160 degrees. If the electronic device 100 is originally in the front lens mode, and then it is detected that the change of the angle between the camera module 130 and the body 110 is 20 degrees due to the camera module 130 is rotated by the external force, at this time, the camera module 130 is slightly rotated relative to the standard position of the front camera mode (the angle is 180 degrees). With the slight rotation, the preview screen seen by the user still matches the image captured by the camera module 130. Therefore, at this time, the processor 150 does not perform an additional image processing program on the image data D1, and controls the display screen 140 directly displays the image data D1.

In one embodiment, the image processing program includes an image blackening process. The image blackening process is configured to blacken the full frame of the image data D1 to generate the processed image data D2 with blacken full frame. In an embodiment, the image blackening process changes each pixel value in the image data D1 to RGB (16, 16, 16), which is not limited thereto.

In one embodiment, when the user is using the electronic device 100 for video communication or live stream function, the camera module 130 is located at the front lens position. At this time, if an external object touches the camera module 130, the position of the lens of the camera module 130 is rotated backwards, the shooting direction of the camera module 130 also is changed, causing the problem of leaking privacy. For example, it may capture the privacy space of the user's room or other people who do not want to be captured when the user is live-streaming. Therefore, when the electronic device 100 further determines that the camera module 130 is flipped by the external force through the processor 150 according to the position information SS1 and SS2 received by the orientation sensing element 170a disposed in the body 110 and the orientation sensing element 170b disposed in the camera module 130, the processor 150 provides the processed image data D2 with a blacken full frame to the display screen 140, and it also transmits the processed image data D2 (as a communication frame of the output streaming video) to an external web server, which avoids the problem of leaking the privacy.

In another embodiment, when the user is using the electronic device 100 for video communication or live stream function, the camera module 130 is located at the front lens position, and the image frame of user is transmitted. At this time, the electronic device 100 receives an incoming call. While the user answers the call, the user may not want to send the picture of answering the incoming call through the video communication or live stream function. At this time, the processor 150 also executes the image blackening process on the full frame of the image data D1, and transmits the processed image data D2 with blacken full frame to an application with a video communication or live stream function.

In another embodiment, the image processing program includes an image flipping program. The image flipping program is configured to flip the full frame of the image data D1 by a specific angle (for example: 180 degrees) to generate the processed image data D2. The full frame of the processed image data D2 is upside down relative to the full frame of the image data D1.

In an embodiment, when the electronic device 100 is in the front lens mode, the camera module 130 is located at the front lens position (that is, the second position). At this time, if the user turns the camera module 130 toward the rear lens position (that is, the first position) by hand (or an external force applied to the camera module 130), as manually flipping the camera module 130 is not the automatically flipping behavior of the camera module 130 controlled by the electronic device 100, and the operating system (such as android system) inside the electronic device 100 does not know it need to switch from the front camera mode to the rear camera mode, therefore, at this time, the electronic device 100 still displays the preview screen based on the front lens mode, and therefore the user sees a upside down image shown on display screen, which will cause to uncomfortable feel of the user when watching the preview screen. Therefore, the electronic device 100 further determines that the camera module 130 is flipped due to an external force by the processor 150 according to the position information SS1 and SS2 received by the orientation sensing element 170a disposed in the body 110 and the orientation sensing element 170b disposed in the camera module 130. When the camera module 130 is flipped by the external force, the processor 150 executes the image flipping program on the image data D1 to generate the processed image data D2, and the processed image data D2 is substantially the same as the preview screen displayed based on the rear lens mode, and in this way, the preview screen seen by the user is consistent with the scene seen by the user's eyes.

In another embodiment, the image processing program includes a mirror image processing program. The mirror image processing program is executing a mirror-symmetrical process on the entire image of the image data D1 along a horizontal symmetry axis or a vertical symmetry axis to generate the processed image data D2. The processed image data D2 is up and down mirrored (relative to the horizontal symmetry axis) or left and right mirrored (relative to the vertical symmetry axis) relative to the full frame of the image data D1.

FIG. 3 is a schematic diagram of the internal architecture of the operating system 151 executed by the processor 150 according to some embodiments. the camera module 130 captures the image data D1 and transmits it to the processor 150, and meanwhile the orientation sensing elements 170a and 170b also transmit the currently detected position information SS1 and SS2 to the processor 150. The operating system 151 executed by the processor 150 processes the image data D1 and the position information SS1 and SS2 received by the processor 150. The operating system 151 includes a kernel module 1510, a hardware abstraction layer module 1511, and an application software execution module 1512. In an embodiment, the operating system 151 is an Android system. In this embodiment, the kernel module 1510 is the execution core layer of the Android system, the hardware abstraction layer module 1511 is the hardware abstraction layer of the Android system, and the application software execution module 1512 is the application software layer of the Android system. In another embodiment, the kernel module 1510, the hardware abstraction layer module 1511, and the application software execution module 1512 are implemented by the processor 150, a processing circuit, or an application-specific integrated circuit (ASIC).

In an embodiment, the kernel module 1510 receives the image data D1 from the camera module 130 and receives the position information SS1 and SS2 from at least one of orientation sensing element such as two direction sensing elements 170a and 170b shown in FIG. 1A and FIG. 1B. In one embodiment, the hardware abstraction layer module 1511 receives the image data D1 and the position information SS1 and SS2 from the kernel module 1510. In one embodiment, the application software execution module 1512 receives the position information SS1 and SS2 from the hardware abstraction layer module 1511. In one embodiment, the application software execution module 1512 receives the incoming call signal CIN.

When receiving the incoming call signal CIN or determining that the camera module 130 is flipped by the external force based on the received position information SS1 and SS2, the application software execution module 1512 transmits a control signal CS to the hardware abstraction layer module 1511. Then, the hardware abstraction layer module 1511 executes the image processing program on the image data D1 according to the control signal CS to generate the processed image data D2, and transmits the processed image data D2 to the application software execution module 1512. Next, the application software execution module 1512 controls the display screen 140 to display the processed image data D2. In another embodiment, the application software execution module 1512 transmits the processed image data D2 to a web server as an output streaming image.

In one embodiment, the driver application in the application software execution module 1512 receives the incoming call signal CIN when someone calls. In addition, the driver application in the application software execution module 1512 keeps receiving the position information SS1 and SS2 from each of the orientation sensing elements 170a and 170b. In an embodiment, the driving application calculates the angle θs between the camera module 130 and the body 110 according to the received position information SS1 and SS2. Then, the driver application compares the angle θs with a preset angle θt. In an embodiment, the preset angle θt is a preset value, such as 165 degrees, 150 degrees, 135 degrees, or 120 degrees. The preset angle θt shown in the embodiments of FIG. 2A and FIG. 2B is described by taking about 150 degrees as an example, which is not limited herein.

When the angle θs is smaller than the preset angle θt, the driver application in the application software execution module 1512 determines that the camera module 130 is flipped by the external force, and then, the driver application in the application software execution module 1512 transmits the control signal CS to the hardware abstraction layer module 1511. The hardware abstraction layer module 1511 executes the image processing program on the image data D1 according to the control signal CS to generate the processed image data D2, and transmits the processed image data D2 of the video communications to the video communication application or live stream application in the application software execution module 1512. Then, the video communication application or live stream application controls the display screen 140 to display the processed image data D2, and at the same time, the processed image data D2 is transmitted to an external web server as an output streaming image.

In another embodiment as the driver application in the application software execution module 1512 receives an incoming call signal. When the user answers the call and wants to keep the image of the incoming call information on the screen privacy, that is, to avoid the image of the incoming call on the screen to be transmitted while the video communication or live stream function still executing. The driver application in the application software execution module 1512 transmits the control signal CS to the hardware abstraction layer module 1511, and the hardware abstraction layer module 1511 executes the image processing program on the image data D1 according to the control signal CS to generate the processed image data D2 (such as a black image), and transmits the processed image data D2 to the video communication application or live stream application in the application software execution module 1512.

In summary, the electronic device provided in the disclosure avoids privacy information being leaked by the live stream software or video communication software under circumstance of that the camera module is rotated by an external force or receiving a sudden incoming call while a user is utilizing live stream or video communication applications. In addition, the processed image data generated by performing image processing on the image data captured by the camera module in the hardware abstraction layer module is transmitted to various applications that displays images in the application software execution module.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   a body;
   a display screen, disposed on a first side of the body;
   a camera module, rotatably disposed on the body and configured to capture image data;
   a plurality of orientation sensing elements, disposed on the body and the camera module, respectively, the orientation sensing elements are configured to detect each positions of the camera module or the body and generate a plurality of position information; and
   a processor, electrically connected to the display screen, the camera module, and the orientation sensing elements, and the processor is configured to perform the following steps:
   determining whether an incoming call signal is received or the camera module are inverted by an external force when the electronic device is determined in a front camera mode; and
   executing an image processing program on the image data received from the camera module to generate a processed image data and controlling the display screen to display the processed image data when the processor determines that the incoming call signal is received or the camera module is rotated by the external force.

2. The electronic device according to claim 1, the processor is configured to execute an operating system, the operating system further comprising:
   a kernel module, configured to receive the image data from the camera module;
   a hardware abstraction layer module, configured to receive the image data from the kernel module; and
   an application software execution module, configured to receive the incoming call signal and receive the position information generated by the orientation sensing elements,
   wherein, when receiving the incoming call signal or determining that the camera module is flipped by the external force based on the received position information, the application software execution module sends a control signal to the hardware abstraction layer module, the hardware abstraction layer module execute the image processing program on the image data according to the control signal to produce the processed image data, and transmits the processed image data to the application software execution module, the application software execution module controls the display screen to display the processed image data.

3. The electronic device according to claim 2, wherein the image processing program is an image blackening process, and the image blackening process is configured to blacken the full frame of the image data to produce the processed image data with a completely black picture.

4. The electronic device according to claim 3, wherein the hardware abstraction layer module executes the image blackening process to generate the processed image data with the blackened full frame, and transmits the processed image data to the application software execution module.

5. The electronic device according to claim 2, wherein the image processing program is an image flipping program, and the image flipping program is configured to flip the full frame of the image data to generate the processed image data.

6. The electronic device according to claim 5, wherein the hardware abstraction layer module executes the image flipping program to flip the full frame of the image data to produce the processed image data, and transmits the processed image data to the application software execution module.

7. The electronic device according to claim 2, wherein the image processing program is a mirror image processing program, and the mirror image processing program is a mirror symmetry process executed on the entire picture of the image data along the horizontal or vertical symmetry axis to generate the processed image data.

8. The electronic device according to claim 2, when the application software execution module receives the incoming call signal or determining that the camera module is flipped by the external force based on the received position information, the application software execution module transmits the processed image data generated by the hardware abstraction layer module as an output streaming image.

9. The electronic device according to claim 2, wherein the application software execution module determines the angle between the camera module and the body according to the received position information, and determines whether the camera module is flipped by the external force according to the angle.

10. The electronic device according to claim 9, wherein the application software execution module compares the angle with a preset angle and determines that the camera module is flipped by the external force when the angle is less than the preset angle.

* * * * *